{| |}
United States Patent
Iwaki

(10) Patent No.: US 10,003,247 B2
(45) Date of Patent: Jun. 19, 2018

(54) LINEAR ACTUATOR

(71) Applicant: THK CO., LTD., Tokyo (JP)

(72) Inventor: Junichiro Iwaki, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days. days.

(21) Appl. No.: 15/539,906

(22) PCT Filed: Nov. 11, 2015

(86) PCT No.: PCT/JP2015/081687
§ 371 (c)(1),
(2) Date: Jun. 26, 2017

(87) PCT Pub. No.: WO2016/103947
PCT Pub. Date: Jun. 30, 2016

(65) Prior Publication Data
US 2018/0123438 A1    May 3, 2018

(30) Foreign Application Priority Data

Dec. 26, 2014  (JP) ................................ 2014-264117

(51) Int. Cl.
H02K 41/02  (2006.01)
H02K 41/03  (2006.01)
H02K 41/06  (2006.01)

(52) U.S. Cl.
CPC .......... H02K 41/031 (2013.01); H02K 41/06 (2013.01)

(58) Field of Classification Search
CPC ...... H02K 41/00; H02K 41/03; H02K 41/031; H02K 33/16; H02K 35/02
See application file for complete search history.

(56) References Cited

U.S. PATENT DOCUMENTS 7,250,696 B2 * 7/2007 Kim ...................... H02K 41/03
                                                            310/12.05
7,425,783 B2 * 9/2008 Sakiya .................... H02P 25/06
                                                            310/12.22
(Continued)

FOREIGN PATENT DOCUMENTS

CN          1612447          5/2005
CN          102223050        10/2011
(Continued)

OTHER PUBLICATIONS

Chinese Office Action 201580069456.6 dated Dec. 19, 2017.
International Search Report, PCT/JP2015/081687, dated Feb. 16, 2016.

Primary Examiner — Tran Nguyen
(74) Attorney, Agent, or Firm — Young & Thompson

(57) ABSTRACT

Provided is a linear actuator wherein a moving element can be moved in a direction normal to the direction of arrangement of coils. The moving element 1 has first to third magnets 6a-6c arranged in the X-direction. Each of the first to third magnets 6a-6c has N poles and S poles arranged in the θ-direction. The N poles and S poles of the second magnet 6b are shifted in the θ-direction relative to the N poles and S poles of the first magnet 6a. The N poles and S poles of the third magnet 6c are shifted in the θ-direction relative to the N poles and S poles of the second magnet 6b. A stator 2 has at least two salient poles 8a arranged in the θ-direction, and at least two coils 4a, 4b wound around the salient poles 8a.

20 Claims, 8 Drawing Sheets

(56) References Cited

U.S. PATENT DOCUMENTS

| | | | | |
|---|---|---|---|---|
| 8,786,142 B2* | 7/2014 | Lee | ................ | H02K 41/031 |
| | | | | 310/12.26 |
| 9,467,035 B2* | 10/2016 | Endo | ................ | B06B 1/045 |
| 2011/0298308 A1* | 12/2011 | Aoyama | ................ | H02K 41/03 |
| | | | | 310/12.15 |
| 2012/0187779 A1 | 7/2012 | Lee | | |
| 2014/0084710 A1 | 3/2014 | Endo et al. | | |

FOREIGN PATENT DOCUMENTS

| | | |
|---|---|---|
| CN | 102843015 | 12/2012 |
| CN | 103459052 | 12/2013 |
| JP | 2011-217591 | 10/2011 |
| JP | 2013-506394 | 2/2013 |
| JP | 2013-102695 | 5/2013 |
| JP | 2014-209832 | 11/2014 |

\* cited by examiner

FIG. 3
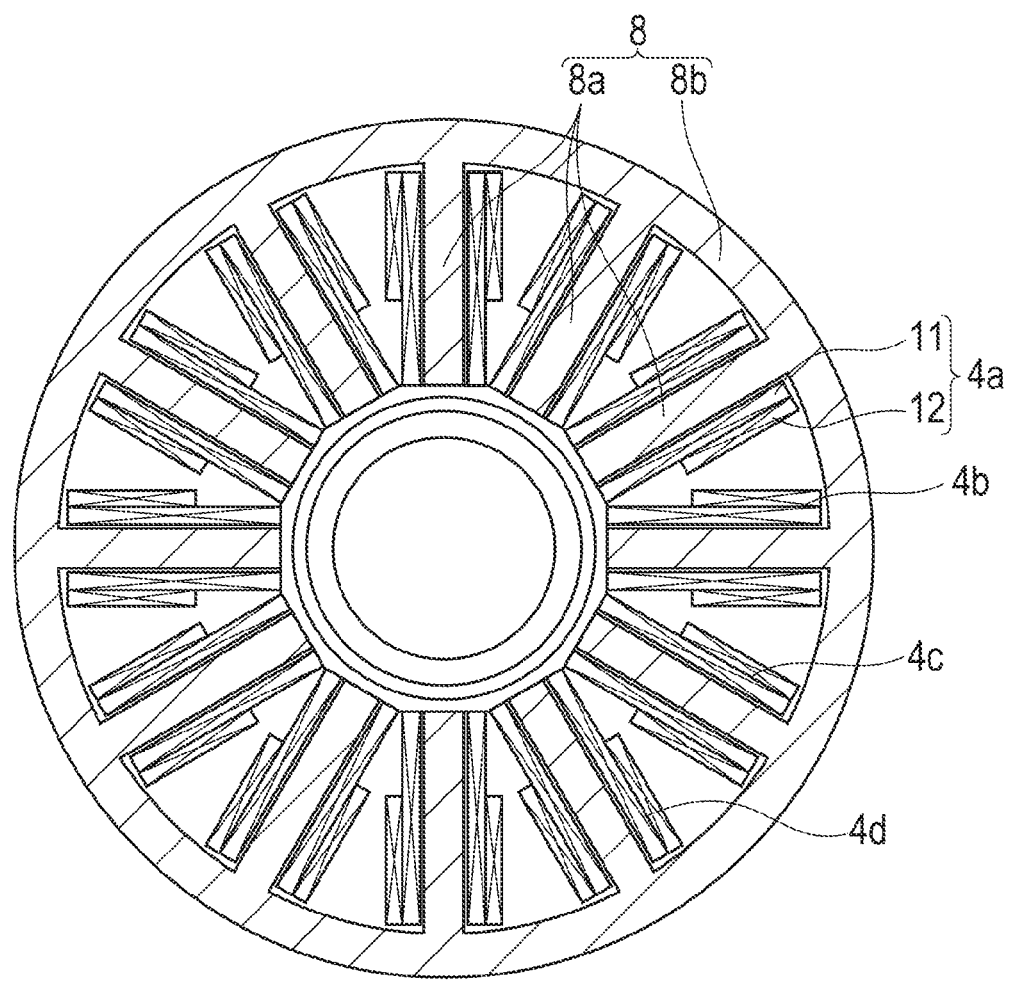
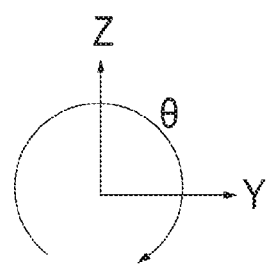

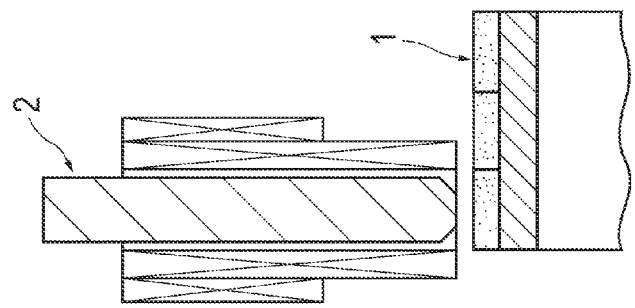
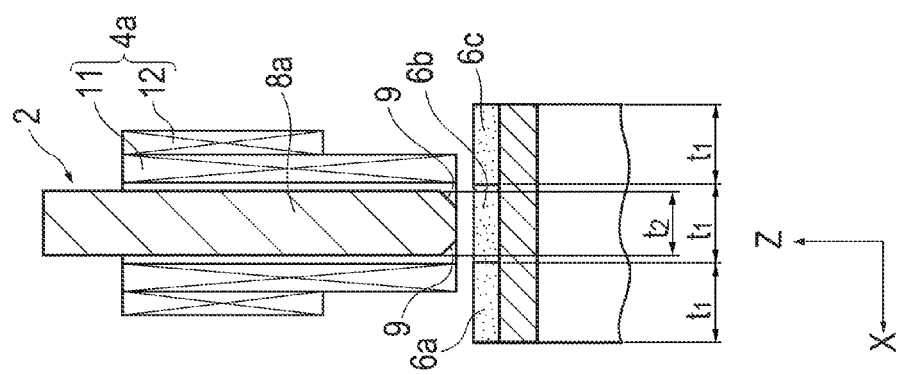
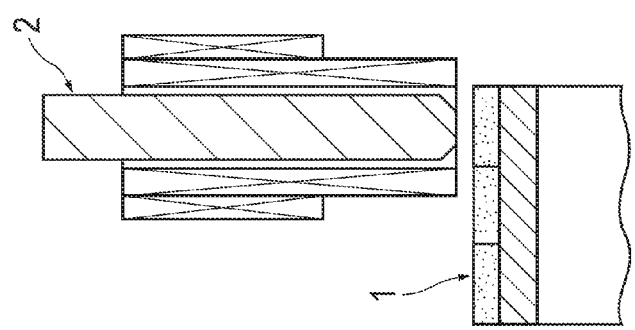

LINEAR ACTUATOR

TECHNICAL FIELD

The present invention relates to a linear actuator having a first member that can move relative to a second member in a direction.

BACKGROUND ART

A synchronization type linear actuator that uses magnets as field systems is one type of linear actuators. This linear actuator includes a stator, which has a plurality of magnets arranged in a direction such that the polarities of the magnets are altered alternately, and a moving element, which has a plurality of coils arranged in the direction such that the coils face a row of the magnets of the stator (see Patent Literature Document 1). The coils are wound around salient poles of cores that face the row of the magnets of the stator. As an alternating current flows in the coils, the interaction between magnetic fluxes generated at the magnets and magnetic fluxes generated at the salient poles causes the moving element to move relative to the stator in the direction. The linear actuator that has the moving coils, such as the linear actuator disclosed in Patent Literature Document 1, is called a moving coil type linear actuator. A certain linear actuator has moving magnets, which move instead of the coils, and this linear actuator is called a moving magnet type linear actuator.

LISTING OF REFERENCES

Patent Literature Documents

PATENT LITERATURE DOCUMENT 1: Japanese Patent Application Laid-Open Publication No. 2011-217591

SUMMARY OF THE INVENTION

Problems to be Solved by the Invention

It goes without saying that the conventional linear actuator causes the moving element to move in the same direction as the arrangement direction of the coils. However, the conventional linear actuator cannot cause the moving element to move in a direction perpendicular to the arrangement direction of the coils. If such movement was possible, it would be possible to cause the moving element to move in a way that draws people's eyes, and expand the range of use of the linear actuator.

Thus, an object of the present invention is to provide a linear actuator that can cause the moving element to move in a direction perpendicular to the arrangement direction of the coils.

Solution to the Problems

In order to overcome the above-mentioned problems, one aspect of the present invention provides a linear actuator including a first member that is movable relative to a second member in a direction, the first member has a first magnet, a second magnet, and a third magnet arranged in the above-mentioned direction, each of the first magnet, the second magnet, and the third magnet has N poles and S poles in a direction perpendicular to the above-mentioned direction, the N poles and the S poles of the second magnet are shifted from the N poles and the S poles of the first magnet in the direction perpendicular to the above-mentioned direction, the N poles and the S poles of the third magnet are shifted from the N poles and the S poles of the second magnet in the direction perpendicular to the above-mentioned direction, the second member has at least two salient poles, which are arranged in the direction perpendicular to the above-mentioned direction and face the first member, and at least two coils wound around the salient poles, respectively.

Advantageous Effects of the Invention

The present invention can cause the moving element (first member or second member) to move in a direction perpendicular to an arrangement direction of coils.

BRIEF DESCRIPTION OF THE DRAWINGS

FIG. 3 is a cross-sectional view of the linear actuator according to the embodiment of the present invention in a Y-Z plane.

FIG. 4 is a set of cross-sectional views of the linear actuator according to the embodiment of the present invention, taken along the X-axis. (FIG. 4A shows when the moving element is present at one end of a stroke, FIG. 4B shows when the moving element is present in the middle of the stroke, and FIG. 4C shows when the moving element is present at an opposite end.)

MODE FOR CARRYING OUT THE INVENTION

A linear actuator according to an embodiment of the present invention will now be described with reference to the accompanying drawings. It should be noted that the linear actuator of the present invention may be embodied in various forms and modes, and is not limited to an embodiment described in this specification. This embodiment is provided with an intention that a skilled person would sufficiently understand the scope of the invention as a result of providing a sufficient disclosure in this specification.

Figure 1:
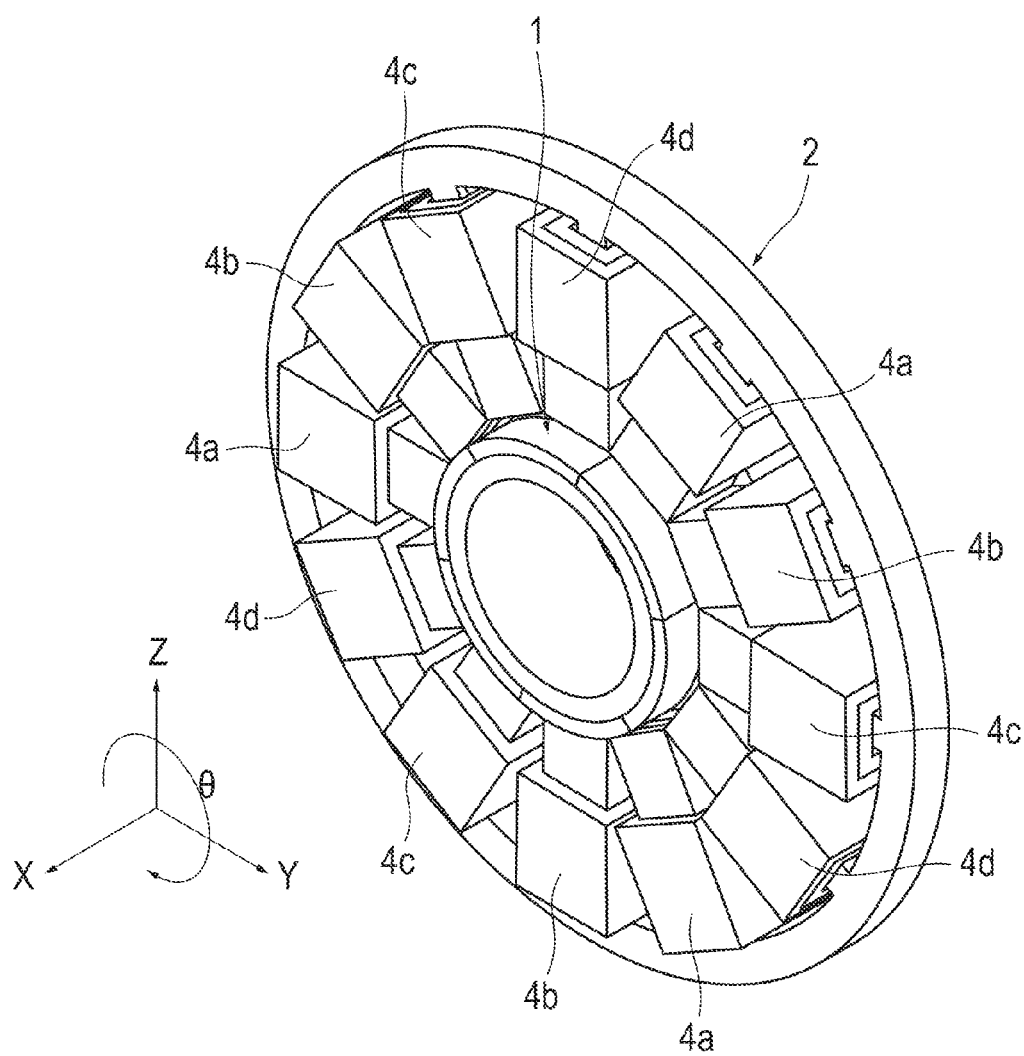
FIG. 1 is a perspective view of a linear actuator according to one embodiment of the present invention.
Figure 2:
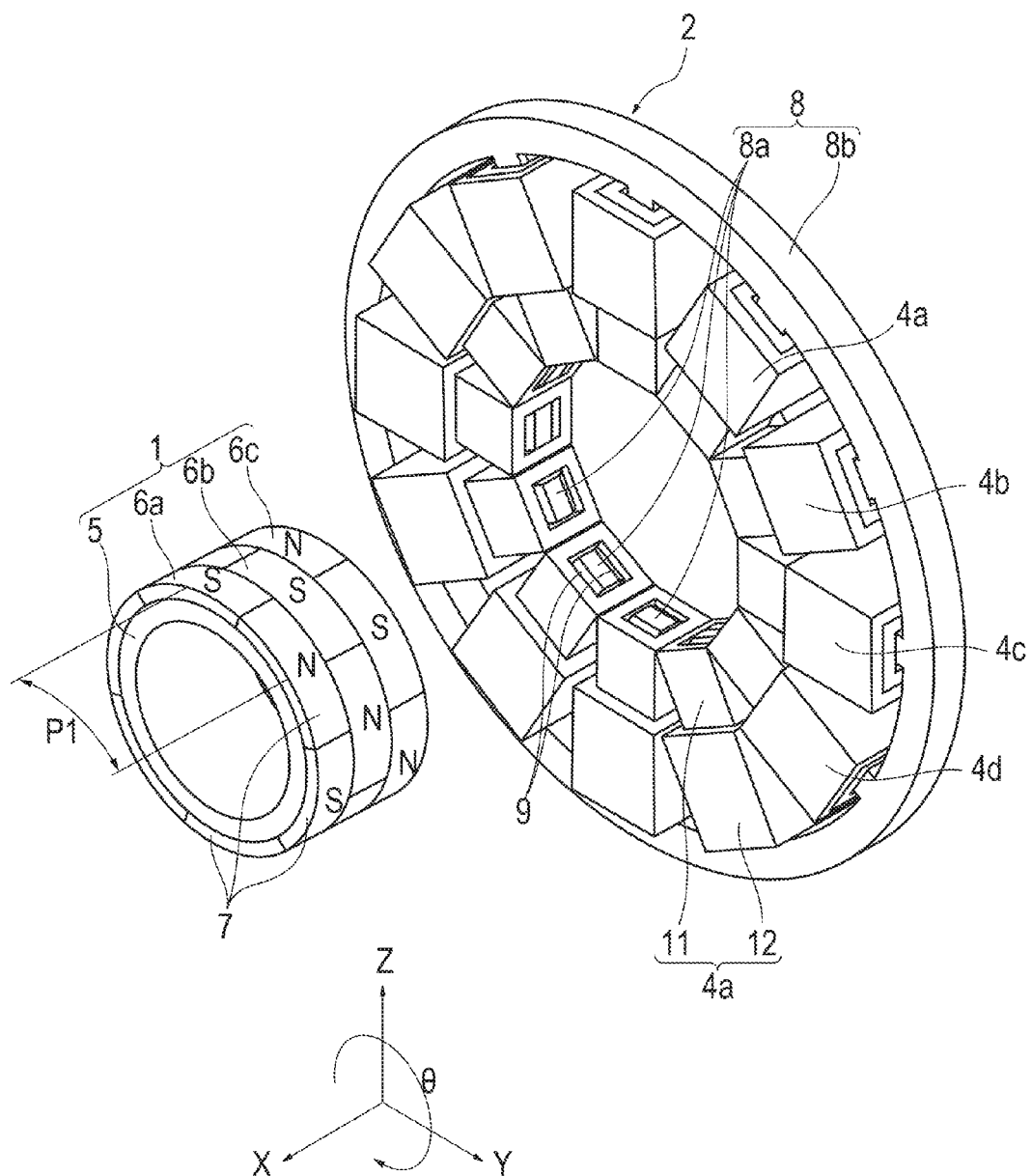
FIG. 2 is an exploded perspective view of FIG. 1.

FIG. 1 shows a perspective view of a linear actuator according to one embodiment of the present invention, and FIG. 2 shows an exploded perspective view of FIG. 1. Same reference numerals are assigned to same configurations throughout the accompanying drawings and the following description of the specification.

As illustrated in FIG. 1, the linear actuator includes a moving element 1, which is a first member, and a stator 2, which is a second member. The moving element 1 has a cylindrical shape. The stator 2 has a ring shape that surrounds the moving element 1. The linear actuator is configured such that the moving element 1 is caused to move in a direction (i.e., in an axial direction) upon magnetizing coils 4a-4d of the stator 2. In the following description, the axial direction of the moving element 1 is referred to as an "X-direction," a plane normal to the X-direction is referred to as a "Y-Z plane," and a circumferential direction in the Y-Z plane is referred to as a "θ direction."

A plurality of coils 4a-4d are arranged on the ring-shaped stator 2 in the θ direction. In case of a common rotary motor, the moving element 1 rotates in the θ direction if the coils are arranged in the θ direction. The linear actuator of the present invention is characterized in that the moving element 1 moves in the X-direction even though the coils 4a-4d are arranged in the θ direction. In the following description, the configurations of the moving element 1 and the stator 2 will be described in turn.

As shown in FIG. 2, the moving element 1 has a cylindrical yoke 5, a first magnet 6a, a second magnet 6b and a third magnet 6c. The first to third magnets 6a, 6b and 6c are disposed along the outer periphery of the yoke 5, and each of the magnets has a ring shape. The first magnet 6a, the second magnet 6b and the third magnet 6c are coupled to the outer periphery of the yoke 5 by coupling means such as an adhesive. The first magnet 6a, the second magnet 6b and the third magnet 6c have the same size, and are arranged next to each other in the X-direction. The yoke 5 is made from a magnetic material that allows the penetration of magnetic fluxes.

The first magnet 6a has a plurality of arc-shaped segment magnets 7 that possess N poles and S poles alternately in the θ direction, and the segment magnets 7 are arranged such that the segment magnets 7 have different polarities alternately in the θ direction. The number of the magnetic poles (the number of segment magnets 7) is not limited to a particular number. For example, the number of the magnetic poles may be six. The outer periphery of each of the segment magnets 7 is magnetized to one of the N pole and the S pole, and the inner periphery of each of the segment magnets 7 is magnetized to the other of the N pole and the S pole. The first magnet 6a may be configured such that the first magnet is not divided into the segment magnets 7, but it has a ring shape and is magnetized to the N poles and the S poles alternately in the θ direction.

Similar to the first magnet 6a, each of the second magnet 6b and the third magnet 6c has a plurality of arc-shaped segment magnets 7 that possess N poles and S poles alternately in the θ direction, and the segment magnets 7 are arranged such that the segment magnets 7 have different polarities alternately in the θ direction. All of the first magnet 6a, the second magnet 6b and the third magnet 6c have the same number of the magnetic poles, for example six.

The N poles and the S poles of the second magnet 6b are shifted from the N poles and the S poles of the first magnet 6a in one direction (clockwise direction) of the θ direction by a half of a pitch P1 (distance in the θ direction) between the N pole and the S pole. The N poles and the S poles of the third magnet 6c are shifted from the N poles and the S poles of the second magnet 6b in one direction (clockwise direction) of the θ direction by a half of the pitch P1 between the N pole and the S pole. It should be noted that the third magnet 6c is not shifted from the second magnet 6b in the opposite direction (counterclockwise direction) of the θ direction. The N poles and the S poles of the third magnet 6c are shifted from the N poles and the S poles of the first magnet 6a in one direction (clockwise direction) of the θ direction by the pitch P1 between the N pole and the S pole, and the third magnet 6c has the reversed magnetic polarities to the first magnet 6a.

The stator 2 has the following configuration. As shown in FIG. 2, the stator 2 has a core 8, and a plurality of coils 4a-4d wound around salient poles 8a of the core 8. The core 8 has a core main body 8b that has a ring shape and surrounds the moving element 1, and a plurality of salient poles 8a that protrude from the core main body 8b in the radially inward direction (see also FIG. 3). The number of the salient poles 8a is twice the number of the magnetic poles of the first to third magnets 6a-6c of the moving element 1. Because the number of the magnetic poles is six, the number of the salient poles 8a is twelve. Free ends of the salient poles 8a face the moving element 1 with a magnetic gap being left between them. The core 8 is made from a magnetic material such as silicon steel.

The core 8 is fabricated, for example, by laminating a plurality of steel plates, which are separated by the Y-Z planes, in the X-direction. Alternatively, the core 8 may be divided into twelve core segments along division lines extending in the radial direction of the core 8, the coils 4a-4d may be wound around the salient poles 8a of the core segments, and the core segments having the coils 4a-4d wound therearound may be united in the θ direction to fabricate the core 8.

FIG. 4 shows a set of cross-sectional views of the linear actuator, taken along the X-axis. As illustrated in FIG. 4B, the length $t_2$ of each of the salient poles 8a of the core 8 in the X-direction is shorter than the length $t_1$ of each of the first to third magnets 6a-6c. Each of the first to third magnets 6a-6c has the length $t_1$ in the X-direction, and the first to third magnets 6a-6c have the equal length in the X-direction. The free end of the salient pole 8a is chamfered (see also FIG. 2) at opposite edges in the X-direction, which are designated at 9.

As depicted in FIG. 2, each of the coils 4a-4d has an inner coil 11 that has a cylindrical shape, with a rectangular cross-sectional shape, and an outer coil 12 that is disposed outside the inner coil 11 and has a cylindrical shape, with a rectangular cross-sectional shape. The inner coil 11 spans the entire length of the associated salient pole 8a. The outer coil 12 is shorter than the inner coil 11, and is only present around the radially outward portion of the salient pole 8a. Windings of the inner coil 11 are electrically connected to windings of the outer coil 12.

As illustrated in FIG. 3 that is a cross-sectional view in the Y-Z plane, the gap between each two adjacent salient poles 8a is larger at the outer periphery and shorter at the inner periphery, i.e., the gap has a fan shape. By dividing the coils 4a-4d into the inner coils 11 and the outer coils 12, it is possible to efficiently dispose the coils 4a-4d in the fan-shaped gaps. It should be noted that the coils 4a-4d may not be divided into the inner coils 11 and the outer coils 12, but each of the coils may be shaped like a trapezoid.

The moving element 1 shown in FIG. 1 is supported by the stator 2 via a supporting unit such that the moving element 1 can move in the X-direction. The supporting unit may include a known bearing such as a ball spline, a ball bushing, a slide bearing or the like. Alternatively, a plate spring bridging the moving element 1 and the stator 2, a cylindrical rubber interposed between the moving element 1 and the stator 2, or the like may be used in place of the bearing.

FIG. 4 shows a set of cross-sectional views of the linear actuator, taken along the X-axis. FIG. 4B shows when the moving element 1 is present at the center of the stroke, FIG. 4A shows when the moving element 1 is present at one end of the stroke, and FIG. 4C shows when the moving element 1 is present at the other end of the stroke. The linear actuator of this embodiment is an oscillating actuator having the moving element 1 that moves from one end of the stroke to the other end of the stroke, and moves from the other end of the stroke to one end of the stroke alternately. It should be noted that use of the linear actuator of the present invention is not limited to the oscillating actuator.

Figure 5:
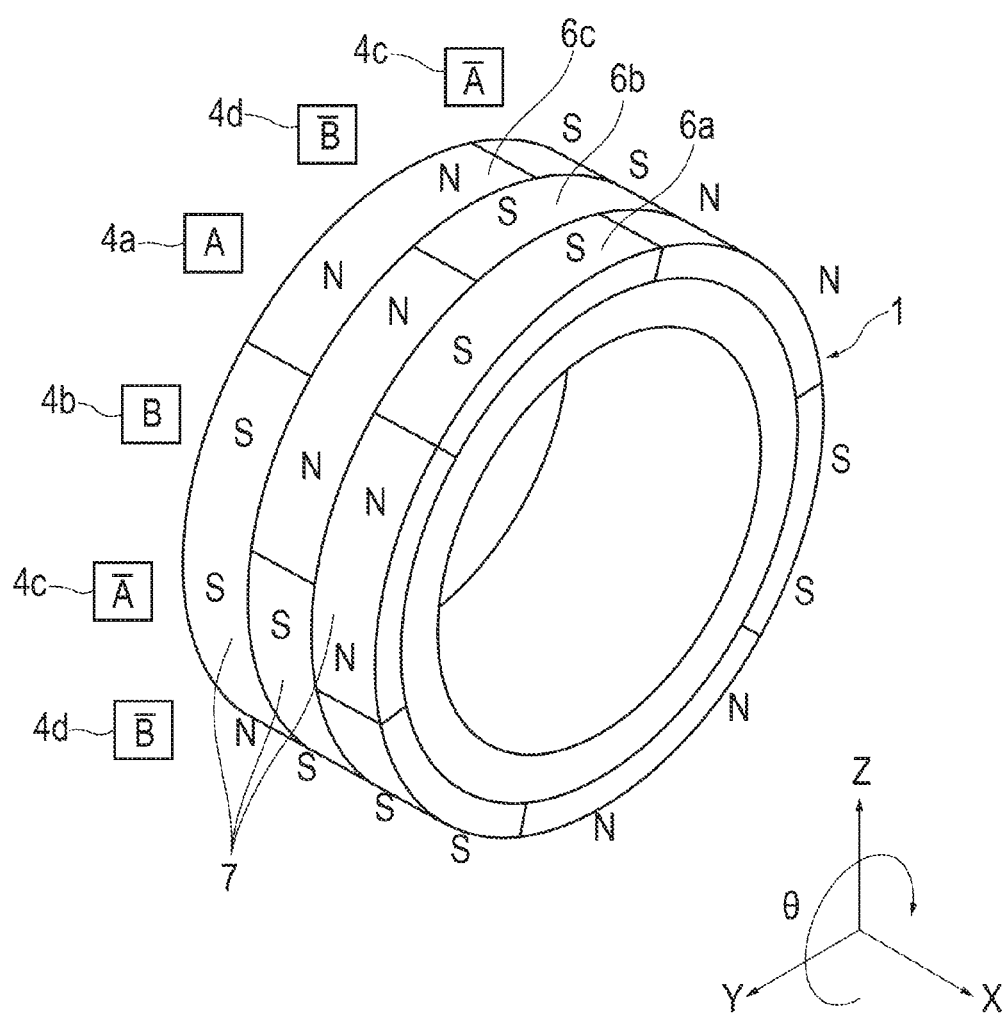
FIG. 5 is a perspective view of the moving element to show magnetic polarities along the outer peripheries of first to third magnets.

FIG. 5 is a perspective view of the moving element 1, which shows the magnetic polarities of the outer peripheries of the first to third magnets 6a-6c. The rectangles in FIG. 5 indicate the coils 4a-4d that face the moving element 1, and the characters "A," "B," "/A," and "/B" in the rectangles indicate the magnetization of the coils 4a-4d. In FIG. 5, each of the segment magnets 7 of the first to third magnets 6a-6c is assigned two magnetic polarities NN or SS. This clarifies that the two coils 4d and 4a, or 4b and 4c, or the like face each segment magnet 7, and the segment magnet 7 has the illustrated magnetic polarities when the segment magnet 7 faces the coils 4d and 4a, or 4b and 4c, or the like. In reality, each segment magnet 7 has one magnetic polarity.

The N, N and S magnetic polarities sequentially face each of the A-phase coils 4a when viewed from the distal side of FIG. 5. The S, N and N magnetic polarities face each of the B-phase coils 4b. The S, S and N magnetic polarities face each of the /A-phase coils 4c. The N, S and S magnetic polarities face each of the /B-phase coils 4d. The A-phase coils 4a are disposed at every four coils in the θ direction. The magnetic polarities of the moving element 1, which face the coils 4a disposed at every four coils, are the same. This is also true to the coils 4b-4d of other phases.

Each four coils of the twelve coils 4a-4d define one set. Each set of four coils 4a-4d are magnetized at an A-phase, a B-phase, an /A-phase and a /B-phase in a similar manner to coils of a two-phase stepping motor. It should be noted that six coils may define a set, and each set of six coils may be magnetized at six phases in a similar manner to coils of a three-phase stepping motor.

Figure 6:
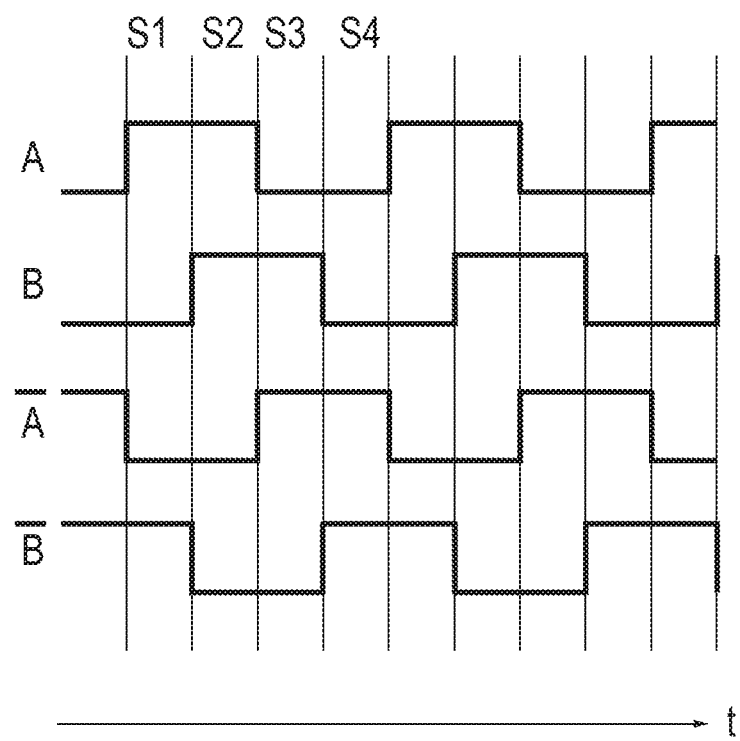
FIG. 6 is a timing chart for magnetizing the coils.

FIG. 6 is a timing chart to show the magnetization of the coils 4a-4d. The A-phase is shifted from the B-phase by 90 degrees in phase. The A-phase is shifted from the /A-phase by 180 degrees in phase. The A-phase is shifted from the /B phase by 270 degrees in phase. It should be noted that the magnetization of the coils is not limited to the above-mentioned magnetization. For example, a waveform of a voltage to be applied to the coils may be a sine wave instead of the square wave.

Figure 7:
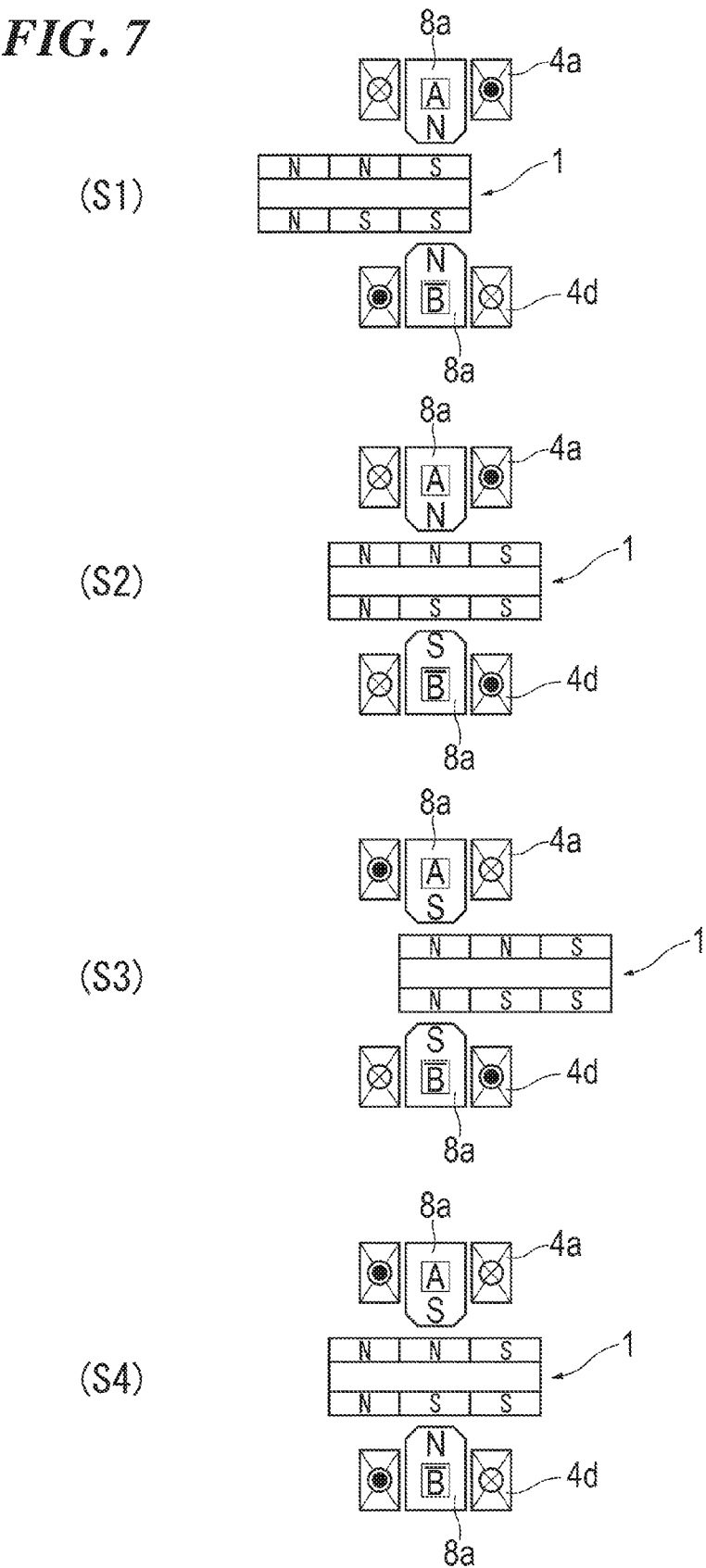
FIG. 7 is a set of views to show an oscillation principle of the moving element.

FIG. 7 is a set of schematic views that show an oscillation principle of the moving element 1. FIG. 7 illustrates only the A-phase coil 4a and the adjacent /B-phase coil 4d, which are extracted from FIG. 5. The magnetic polarities of the moving element 1 which face the A-phase coil 4a are the N, N and S poles when viewed from the distal side of FIG. 5. The magnetic polarities of the moving element 1 which face the /B-phase coil 4d are the N, S and S poles when viewed from the distal side of FIG. 5. When the A-phase coil 4a is magnetized in accordance with the magnetization shown in FIG. 6, the polarity of the salient pole 8a of the A-phase coil 4a changes in the following manner; the N pole at S1, the N pole at S2, the S pole at S3, and the S pole at S4. When the /B-phase coil 4d is magnetized in accordance with the magnetization shown in FIG. 6, the polarity of the salient pole 8a of the /B-phase coil 4d changes in the following manner; the N pole at S1, the S pole at S2, the S pole at S3, and the N pole at S4. As the polarities of the salient poles 8a of the coils 4a and 4d change, the moving element 1 changes its position to the left end position (S1), the center position (S2), the right end position (S3), and the center position (S4). Thus, the moving element 1 oscillates. It should be noted that although the combination of the A-phase coil 4a and the /B-phase coil 4d is only illustrated in FIG. 7, a combination of the A-phase coil 4a and the B-phase coil 4b can similarly cause the moving element 1 to oscillate, a combination of the /A-phase coil 4c and the B-phase coil 4b can similarly cause the moving element 1 to oscillate, and a combination of the /A-phase coil 4c and the /B-phase coil 4d can similarly cause the moving element 1 to oscillate. In short, it is possible to cause the moving element 1 to oscillate as long as a combination of the coil 4a, 4c, which is magnetized by the sine wave, and the coil 4b, 4d, which is magnetized by a cosine wave, is used.

Figure 8:
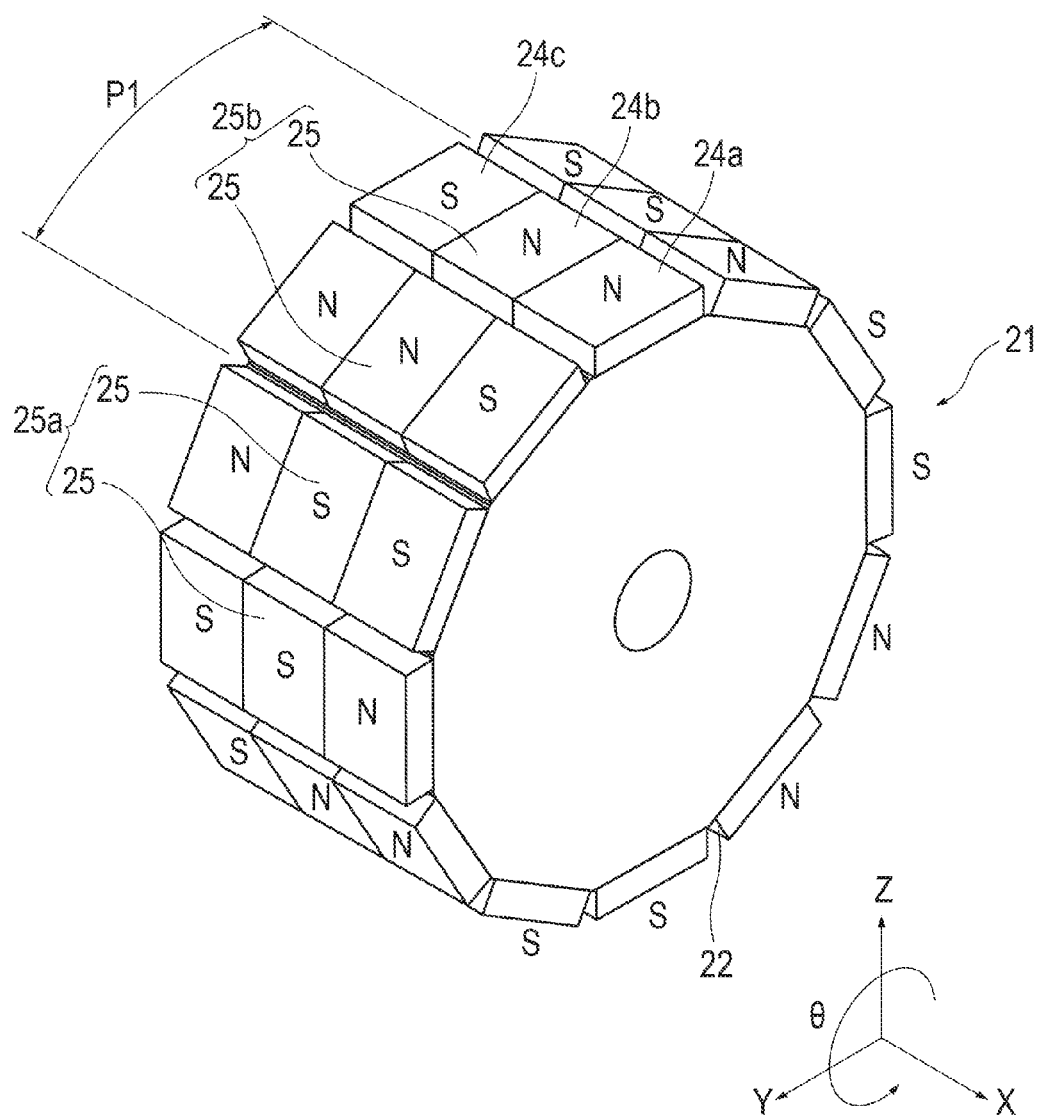
FIG. 8 is a perspective view that shows another example of the moving element.

FIG. 8 shows another example of the moving element. The moving element 21 of this example includes a yoke 22 having a round column shape, first magnets 24a, second magnets 24b, and third magnets 24c. The first to third magnets are arranged on the outer periphery of the yoke 22 in the X-direction. Each of the first magnet 24a, the second magnet 24b, and the third magnet 24c has a plurality of magnets 25 arranged in the θ direction. The number of the magnets 25 is twelve, which is equal to the number of the coils 4a-4d. Each of the magnets 25 is a plate-like rectangular magnet that is magnetized in the height direction (i.e., the radial direction). Alternatively, the magnet 25 may be a magnet having a round column shape.

Each two magnets 25 adjacent to each other in the θ direction constitute a pair of magnets 25a, or a pair of magnets 25b. The magnetic polarities of the two magnets 25 in each pair 25a, 25b are the same. The magnetic polarities of the magnets 25 in one magnet pair 25a are opposite to the magnetic polarities of the magnets 25 in an adjacent magnet pair 25b. When the magnets 25 are looked at pair-by-pair, the polarities which are similar to the segment magnets 7 shown in FIG. 5 are established. It should be noted that in this example the N poles and the S poles of the second magnet 24b are shifted from the N poles and the S poles of the first magnet 24a by the half of the N pole-S pole pitch P1 in one direction (counterclockwise direction) of the θ direction. The N poles and the S poles of the third magnet 24c are shifted from the N poles and the S poles of the second magnet 24b by the half of the N pole-S pole pitch P1 in one direction (counterclockwise direction) of the θ direction. The N poles and the S poles of the third magnet 24c are shifted from the N poles and the S poles of the first magnet 24a by the N pole-S pole pitch P1, which is the distance in the θ direction, in one direction (counterclockwise direction) of the θ direction, and the magnet polarities of the third magnet 24c are opposite to the magnet polarities of the first magnet 24a. Similar to the previous example, the moving element 21 of this example can cause the moving element 21 to oscillate with the coils 4a, 4c, which are magnetized by the sine wave, and the coils 4b, 4d, which are magnetized by the cosine wave.

The linear actuator of this embodiment has the following advantages. Because the first magnet 6a, the second magnet 6b and the third magnet 6c of the moving element 1 are arranged in the X-direction, the magnetic polarities of the second magnet 6b are shifted from the magnetic polarities of the first magnet 6a in the θ direction, and the magnetic polarities of the third magnet 6c are shifted from the magnetic polarities of the second magnet 6b in the θ direction, it is possible to cause the moving element 1 to move in a direction (X-direction) perpendicular to the arrangement direction (θ direction) of the coils 4a-4d. This makes it possible to achieve the downsizing of the linear actuator in the X-direction, and the enhancement of the driving force.

Because the first to third magnets 6a-6c are disposed in the moving element 1 in the X-direction, it is possible to obtain a linear actuator that is suited for the oscillating actuator, and to cause the moving element 1 to oscillate in a long stroke.

Because the magnetic polarities of the second magnet 6b are shifted from the magnetic polarities of the first magnet 6a by a half of the N pole-S pole pitch in the θ direction, and the magnetic polarities of the third magnet 6c are shifted from the magnetic polarities of the second magnet 6b by the half of the N pole-S pole pitch in the θ direction, it is possible to cause the moving element 1 to oscillate with a strong driving force (high thrust) in the entire stroke.

Because the coils 4a-4d are arranged in the θ direction, and the magnetic polarities of the first to third magnets 6a-6c are arranged in the θ direction, the downsizing of the linear actuator is achieved.

Because the salient poles 8a are connected to the ring-like core main body 8b, it is possible to facilitate (improve) the flow of the magnetic fluxes in the salient poles 8a.

Because the first to third magnets 6a-6c are made from the segment magnets 7, it is possible for each segment magnet 7 to have a substantially equal magnetic flux density in the radial direction from its one end to the opposite end in the θ direction. The magnitudes of the magnetic flux densities of the first to third magnets 6a-6c in the radial direction correlate to the driving force (thrust), and therefore it is possible to obtain the strong driving force.

Because the length $t_1$ of the salient pole 8a in the X-direction is shorter than the length $t_2$ of the first to third magnets 6a-6c in the X-direction, it is possible to reduce a cogging force (torque). The cogging force is derived from attractive forces between the salient poles 8a and the first to third magnets 6a-6c. The cogging force acts on the moving element 1 even when no current flows in the coils 4a-4d, and impedes the thrust. By reducing the cogging force, it is possible to enhance the thrust. It should be noted that if $t_2 \geq t_1$, the cogging force becomes large, as compared to a case of $t_2 < t_1$.

Because the X-direction edges at the free end of each salient pole 8a are chamfered at 9, it is possible to reduce the cogging force, as compared to a case when no chamfering 9 is made. In addition, because the chamfering 9 is made, it is possible for the moving element 1 to have a large stroke.

It should be noted that the present invention is not limited to the above-described embodiment. The present invention may be embodied in various forms within a scope that does not change the subject matter of the present invention.

Although the coils of the stator are arranged in the θ direction, and the magnetic polarities of the magnets of the moving element are arranged in the θ direction in the above-described embodiment, the stator and the moving element may be deployed in a single plane to obtain a flat type linear motor, which is similar to when obtaining a flat type linear motor by deploying the rotary motor(s) in a single plane.

The above-described embodiment is directed to a moving magnet type linear actuator, but the linear actuator of the invention may be a moving coil type linear actuator.

Although the first to third magnets are disposed inside the coils arranged in the θ direction in the above-described embodiment, the first to third magnets may be disposed outside the coils arranged in the θ direction.

Although the moving element has the first to third magnets in the above-described embodiment, the moving element may have first to fourth magnets, first to fifth magnets, or more magnets. In such cases, each magnet is shifted from an adjacent magnet by the half of the N pole-S pole pitch in one direction (e.g., clockwise direction) of the θ direction. In other words, the magnetic polarities of the third magnet are opposite to the magnetic polarities of the first magnet, and the magnetic polarities of the fifth magnet are the same as the magnetic polarities of the first magnet.

Although the stator has a single core in the above-described embodiment, the stator may have two or more cores.

Although the moving element is caused to move in only the X-direction in the above-described embodiment, the moving element may be caused to move in the X-direction and to rotate in the θ direction.

Although the first to third magnets of the moving element have six magnetic polarities in total, which alternately includes the N poles and the S poles in the circumferential direction, the number of the salient poles is twelve, and the number of the coils is twelve in the above-described embodiment, the number of the magnetic poles, the number of the salient poles and the number of the coils are not limited to the above-mentioned numbers. For example, the first to third magnets may have two or four N and S poles in total. Also, the number of the salient poles may be two, four or eight, and the number of the cores may be two, four or eight.

This application is based on Japanese Patent Application No. 2014-264117 filed on Dec. 26, 2014, and the entire disclosure thereof is incorporated herein by reference.

REFERENCE NUMERALS AND SYMBOLS

1 . . . Moving element (first member), 2 . . . Stator (second member), 4a-4d . . . Coils, 6a . . . First magnet, 6b . . . Second magnet, 6c . . . Third magnet, 5 . . . Yoke, 7 . . . Segment magnet, 8 . . . Core, 8a . . . Salient pole, 8b . . . Core main body, 11 . . . Inner coil, 12 . . . Outer coil, P1 . . . Pitch between the N pole and the S pole.

The invention claimed is:

1. A linear actuator including a first member that is movable relative to a second member in a direction,
    the first member having a first magnet, a second magnet, and a third magnet arranged in said direction,
    each of the first magnet, the second magnet, and the third magnet having N poles and S poles in a direction perpendicular to said direction,
    the N poles and the S poles of the second magnet being shifted from the N poles and the S poles of the first magnet in the direction perpendicular to said direction,
    the N poles and the S poles of the third magnet being shifted from the N poles and the S poles of the second magnet in the direction perpendicular to said direction,
    the second member having at least two salient poles, which are arranged in the direction perpendicular to said direction and face the first member, and also having at least two coils, which are arranged in the direction perpendicular to said direction and wound around said salient poles respectively, and
    the at least two coils including an A-phase coil and a B-phase coil which is shifted from the A-phase by 90 degrees in phase, the A-phase coil and a /B-phase coil which is shifted from the A-phase by 270 degrees in phase, an /A-phase coil and the /B-phase coil which is shifted from the /A-phase by 90 degrees in phase, the /A-phase coil and the B-phase coil which is shifted from the /A-phase by 270 degrees in phase, or a coil which is magnetized by a sine wave and a coil which is magnetized by a cosine wave.

2. The linear actuator according to claim 1, wherein the N poles and the S poles of the second magnet are shifted from the N poles and the S poles of the first magnet by a half of a pitch between the N pole and the S pole, in the direction perpendicular to said direction, and the N poles and S poles of the third magnet are shifted from the N poles and the S poles of the second magnet by the half of the pitch between the N pole and the S pole, in the direction perpendicular to said direction.

3. The linear actuator according to claim 1, wherein said direction is an X-direction, and the direction perpendicular to said direction is a circumferential direction in a Y-Z plane perpendicular to the X-direction.

4. The linear actuator according to claim 3, wherein the salient poles are connected to a core main body having a ring shape.

5. The linear actuator according to claim 3, wherein each of the first magnet, the second magnet, and the third magnet is constituted by a plurality of arc-shaped segment magnets, which are magnetized in a radial direction.

6. The linear actuator according to claim 1, wherein each of the first magnet, the second magnet, and the third magnet is constituted by a plurality of plate-like magnets, which are magnetized in a height direction.

7. The linear actuator according to claim 1, wherein a length of each of the salient poles in said direction is shorter than a length of each of the first magnet, the second magnet and the third magnet in said direction.

8. The linear actuator according to claim 1, wherein a free end of each of the salient poles is chamfered at its edges in said direction.

9. The linear actuator according to claim 1, wherein the at least two coils include the A-phase coil, the B-phase coil which is shifted from the A-phase coil by 90 degrees in phase, the /A-phase coil which is shifted from the A-phase coil by 180 degrees in phase, and the /B-phase coil which is shifted from the A-phase coil by 270 degrees in phase.

10. The linear actuator according to claim 1, wherein the at least two salient poles and the at least two coils are provided in said direction and only in a row, and the linear actuator causes the first member to oscillate relative to the second member in said direction.

11. The linear actuator according to claim 2, wherein said direction is an X-direction, and the direction perpendicular to said direction is a circumferential direction in a Y-Z plane perpendicular to the X-direction.

12. The linear actuator according to claim 4, wherein each of the first magnet, the second magnet, and the third magnet is constituted by a plurality of arc-shaped segment magnets, which are magnetized in a radial direction.

13. The linear actuator according to claim 2, wherein each of the first magnet, the second magnet, and the third magnet is constituted by a plurality of plate-like magnets, which are magnetized in a height direction.

14. The linear actuator according to claim 3, wherein each of the first magnet, the second magnet, and the third magnet is constituted by a plurality of plate-like magnets, which are magnetized in a height direction.

15. The linear actuator according to claim 4, wherein each of the first magnet, the second magnet, and the third magnet is constituted by a plurality of plate-like magnets, which are magnetized in a height direction.

16. The linear actuator according to claim 2, wherein a length of each of the salient poles in said direction is shorter than a length of each of the first magnet, the second magnet and the third magnet in said direction.

17. The linear actuator according to claim 2, wherein a free end of each of the salient poles is chamfered at its edges in said direction.

18. The linear actuator according to claim 2, wherein the at least two coils include the A-phase coil, the B-phase coil which is shifted from the A-phase coil by 90 degrees in phase, the /A-phase coil which is shifted from the A-phase coil by 180 degrees in phase, and the /B-phase coil which is shifted from the A-phase coil by 270 degrees in phase.

19. The linear actuator according to claim 3, wherein the at least two coils include the A-phase coil, the B-phase coil which is shifted from the A-phase coil by 90 degrees in phase, the /A-phase coil which is shifted from the A-phase coil by 180 degrees in phase, and the /B-phase coil which is shifted from the A-phase coil by 270 degrees in phase.

20. The linear actuator according to claim 4, wherein the at least two coils include the A-phase coil, the B-phase coil which is shifted from the A-phase coil by 90 degrees in phase, the /A-phase coil which is shifted from the A-phase coil by 180 degrees in phase, and the /B-phase coil which is shifted from the A-phase coil by 270 degrees in phase.

* * * * *